United States Patent
Sugimoto et al.

(10) Patent No.: US 11,877,239 B2
(45) Date of Patent: Jan. 16, 2024

(54) SYSTEMS AND METHODS FOR OPTIMIZING A RADIO METRIC WITHIN A MESH NETWORK BY WAKING UP NODES

(71) Applicant: TOYOTA MOTOR NORTH AMERICA, INC., Plano, TX (US)

(72) Inventors: Shingo Sugimoto, Frisco, TX (US); Walter Accessor, Little Elm, TX (US)

(73) Assignee: Toyota Motor North America, Inc., Plano, TX (US)

( * ) Notice: Subject to any disclaimer, the term of this patent is extended or adjusted under 35 U.S.C. 154(b) by 57 days.

(21) Appl. No.: 17/233,883

(22) Filed: Apr. 19, 2021

(65) Prior Publication Data

US 2022/0338117 A1 Oct. 20, 2022

(51) Int. Cl.
*H04W 4/46* (2018.01)
*H04W 52/02* (2009.01)
*H04W 76/15* (2018.01)
*H04W 64/00* (2009.01)

(52) U.S. Cl.
CPC ......... *H04W 52/0225* (2013.01); *H04W 4/46* (2018.02); *H04W 64/00* (2013.01); *H04W 76/15* (2018.02)

(58) Field of Classification Search
CPC ....... H04W 4/023; H04W 4/50; H04W 4/029; H04W 4/026; H04W 52/0254; H04W 52/027; H04W 52/0274; H04W 8/18; H04W 4/40; H04W 4/70; H04W 68/005; H04W 68/02; H04W 4/025; H04W 12/04; H04W 12/08; H04W 12/35; H04W 4/90; H04W 60/00; H04W 60/06; H04W 68/00; H04W 76/28; H04W 8/04; H04W 8/06; H04W 8/186; H04W 8/20; H04W 8/205; H04W 12/71; H04W 4/02; H04W 64/00; H04W 64/003; H04W 76/27; H04W 12/06; H04W 24/08; H04W 48/10; H04W 48/16; H04W 52/0216; H04W 52/0261; H04W 52/0264; H04W 60/04; H04W 68/04;

(Continued)

(56) References Cited

U.S. PATENT DOCUMENTS

| 8,626,881 B2 | 1/2014 | Saint-Hilaire |
| 9,072,047 B1 | 6/2015 | Goel et al. |
| 9,924,513 B2 | 3/2018 | Sidhu et al. |

(Continued)

OTHER PUBLICATIONS

Lieberau et al., "Energy saving in automotive electronics architectures." CAN Newsletter, Dec. 2012, pp. 46-57.

(Continued)

*Primary Examiner* — Joseph Arevalo
(74) *Attorney, Agent, or Firm* — Dinsmore & Shohl LLP

(57) ABSTRACT

Systems and methods disclosed herein optimize radio metrics between nodes within a mesh network by waking up nodes not actively connected to a mesh network. A mesh network system includes a computing device configured to determine that a radio metric between a first node and a second node in a mesh network is above a predetermined threshold, identify a third node operating in sleep mode, when the radio metric is above the predetermined threshold, and cause the third node to wake and connect to the mesh network, the third node is configured to relay communication between the first node and the second node.

20 Claims, 4 Drawing Sheets

(58) Field of Classification Search
CPC ....... H04W 68/06; H04W 8/005; H04W 8/02; H04W 92/045; H04W 12/48; H04W 4/024
USPC ....... 370/338, 254, 331, 252, 329, 345, 235, 370/311, 230, 332, 330, 220
See application file for complete search history.

(56) References Cited

U.S. PATENT DOCUMENTS

| | | | |
|---|---|---|---|
| 10,375,683 B2* | 8/2019 | Verma | H04L 27/2613 |
| 10,754,411 B2 | 8/2020 | Kim et al. | |
| 10,945,231 B1* | 3/2021 | Henry | G01S 11/06 |
| 11,405,828 B2* | 8/2022 | Lepp | H04L 1/0017 |
| 2010/0177660 A1* | 7/2010 | Essinger | H04W 4/50 370/254 |
| 2015/0296321 A1* | 10/2015 | Kim | H04W 4/70 370/329 |
| 2016/0029403 A1 | 1/2016 | Roy et al. | |
| 2017/0257758 A1* | 9/2017 | Aldana | H04W 12/08 |
| 2018/0321356 A1* | 11/2018 | Kulkarni | H04W 64/003 |
| 2018/0374342 A1 | 12/2018 | Farajpour et al. | |
| 2019/0158340 A1* | 5/2019 | Zhang | H04B 17/318 |
| 2019/0200872 A1* | 7/2019 | Matsuoka | A61B 5/0013 |
| 2019/0342796 A1* | 11/2019 | Lepp | H04L 1/0017 |
| 2020/0244297 A1* | 7/2020 | Zalewski | H04W 76/10 |
| 2020/0260342 A1* | 8/2020 | Vaidya | H04W 36/0083 |
| 2020/0267612 A1* | 8/2020 | Chen | H04W 36/30 |
| 2020/0302187 A1* | 9/2020 | Wang | H04L 25/0224 |
| 2020/0311650 A1* | 10/2020 | Xu | G06Q 10/02 |
| 2020/0367016 A1* | 11/2020 | Jung | H04W 4/023 |
| 2020/0403680 A1* | 12/2020 | Li | H04B 7/0628 |
| 2021/0304878 A1* | 9/2021 | Padmani | G16H 30/20 |
| 2021/0311166 A1* | 10/2021 | Wu | G01S 13/003 |
| 2021/0320825 A1* | 10/2021 | Banuli Nanje Gowda | H04L 25/03968 |
| 2021/0392568 A1* | 12/2021 | Henry | G01S 13/765 |
| 2022/0050726 A1* | 2/2022 | Liu | H04L 67/14 |
| 2022/0155071 A1* | 5/2022 | Gray, Jr. | H04L 51/046 |

OTHER PUBLICATIONS

Chen et al., "Development of Radio-Frequency Sensor Wake Up with Unmanned Aerial Vehicles as an Aerial Gateway." Sensors 2019, vol. 19, 1047. URL: https://doi.org/10.3390/s19051047.

IEEE 802.11s Tutorial—Overview of the Amendments for Wireless Local Area Mesh Networking URL: https://www.ieee802.org/802_tutorials/06-November/802.11s_Tutorial_r5.pdf, Nov. 13, 2006.

Aoki et al., IEEE 802.11s Wireless LAN Mesh Network Technology, NTT DoCoMo Technical Journal vol. 8 No. 2, Sep. 2006, URL: https://www.nttdocomo.co.jp/english/binary/pdf/corporate/technology/rd/technical_journal/bn/vol8_2/vol8_2_013en.pdf.

* cited by examiner

SYSTEMS AND METHODS FOR OPTIMIZING A RADIO METRIC WITHIN A MESH NETWORK BY WAKING UP NODES

TECHNICAL FIELD

The present specification generally relates to mesh networks between vehicles and, more specifically, the present disclosure provides systems and methods for optimizing a connection between nodes of a mesh network by identifying and waking a tertiary node that is operating in a sleep mode.

BACKGROUND

Communication functionality between vehicles, the internet, and other data sources is an ever-increasing requirement for vehicles. Communication functionality enables a vehicle to share information, such as sensor information, receive and transmit system updates, navigation information, and the like. For example, when a vehicle requires an update, a vehicle connects to the internet and receives the update from an internet based data source, such as a server. Additionally, vehicles may be configured to establish peer-to-peer networks, generally referred to as vehicle-to-vehicle communication (V2V). These networks may be established based on proximity of vehicles to each other and/or strength of signal. However, the network connections may be transient as vehicles change speed, direction of travel or the like. Without the ability to establish less transient network connections, the effectiveness of operations, such as edge computing between vehicles or sharing updates, which can consist of large files, may not be fully utilized since the connections may periodically change.

Accordingly, there is a need for mesh networks that are more efficient, reliable, or are otherwise improved.

SUMMARY

In one embodiment, a mesh network system includes a computing device configured to determine that a radio metric between a first node and a second node in a mesh network is above a predetermined threshold, identify a third node operating in sleep mode, when the radio metric is above the predetermined threshold, and cause the third node to wake and connect to the mesh network, the third node is configured to relay communication between the first node and the second node.

In one embodiment, a method includes determining, with a communication center, that a radio metric between a first node and a second node in a mesh network is above a predetermined threshold, identifying, with the communication center, a third node operating in sleep mode, when the radio metric is above the predetermined threshold, and causing the third node to wake and connect to the mesh network, the third node is configured to relay communication between the first node and the second node.

In another embodiment, a vehicle includes a communication unit communicatively coupled to an electronic control unit. The electronic control unit is configured to determine that a radio metric between the vehicle and a second vehicle operating in a mesh network is above a predetermined threshold, identify a third vehicle operating in sleep mode, when the radio metric is above the predetermined threshold, and cause the communication unit to send a push message to the third vehicle to wake and connect the third vehicle to the mesh network, the third vehicle is configured to relay communication between the vehicle and the second vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
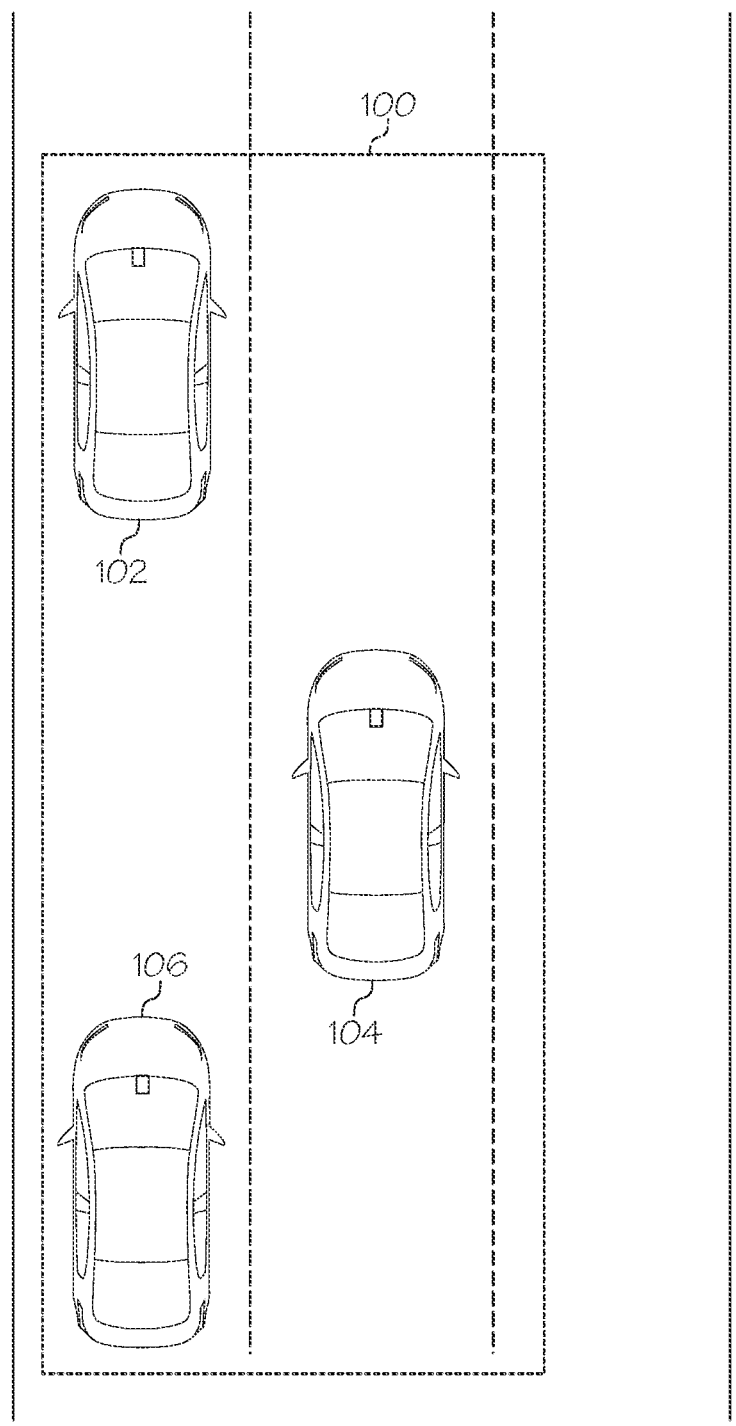
FIG. 1 depicts an illustrative embodiment of a mesh network system including vehicles and a mesh network according to one or more embodiments shown and described herein.

The embodiments disclosed herein relate to systems and methods for optimizing radio metrics between nodes within a mesh network by waking up nodes not actively connected to a mesh network. Embodiments include a computing device or an electronic control unit of a vehicle configured to operate as a communication center that manages routing between nodes (e.g., vehicles) of a mesh network. From time to time, as described herein, when a radio metric between two active nodes is above a predetermined threshold, the communication center may identify a tertiary node and cause that node to wake from sleep mode and connect to the mesh network to improve the radio metric between two other nodes within the network. For example, a communication center may include a registry that includes a routing table identifying nodes, location information for each node, and optionally, data stored at particular nodes. When a communication center of the mesh network identifies a radio metric between two nodes that is above a predetermined threshold, the communication center may determine whether a node operating in sleep mode (e.g., a vehicle with the ignition switched to off) is present in the area of the two nodes such that, if activated, would improve the radio metric. In some embodiments, a mesh network may desire a particular set of data stored at a node that is operating in sleep mode.

The term "sleep mode" or "sleep" as used herein refer to a dual carrier module (DCM) of a communication system that is in a low power mode (e.g., consuming milliwatt (mW) levels of power) and where at least one of the carrier modules of the dual carrier module is not active. DCM refers to communication systems that include multiple communication modules such as 2G, 3G, 4G, 5G or the like communication hardware and WiFi communication hardware or the like. When a node having a DCM enabled communication system operates in sleep mode, the WiFi communication hardware may be unpowered and the communication system may be disconnected from active communications of a network. However, the DCM may periodically transmit to a particular node of broadcast status information including location information. For nodes that are vehicles, the DCM may enter sleep mode when the ignition of the vehicle is switched off. However, this may not occur the instant a vehicle ignition is switched off, rather the DCM may enter sleep mode a minute or two after the ignition is switched off. For example, but without limitation, the DCM may enter sleep mode about 1, 2, 3, 4, 5, 6, 7, 8, 9, or 10 minutes after the ignition is switched off.

In embodiments, when a communication center of the mesh network determines that the activation of a node operating in sleep mode may improve a radio metric between other nodes of the mesh network, the communication center may wake up the node operating in sleep mode by transmitting a push message using short message service (SMS), Message Queuing Telemetry Transport protocol (MQTT), or another push messaging protocol. Upon waking from sleep mode, the node is connected to the mesh network and communications within the mesh network may be routed through the newly active node to other nodes to improve weak radio metrics between some nodes within the mesh network.

Activation and the length of time a tertiary node is used to improve radio metrics within a mesh network may depend on a variety of other metrics such as changes in the proximity of the tertiary node to one or more nodes in the mesh network, the type of power source and/or the power level (e.g., the state of charge of an on-board battery) or the like. For example, as the proximity of the tertiary node to one or more nodes in the mesh network increases, the tertiary node may be disconnected and/or replaced with a different tertiary node because the proximity of the nodes may change the effectiveness of the tertiary node's communication between the nodes of the mesh network. That is, from time to time the communication center may calculate the radio metric between the tertiary node and the other nodes. When the radio metric between the tertiary node and the other nodes surpasses a predefined value, that tertiary node may be deactivated and return to operating in sleep mode. In some embodiments, the type of power source and/or the power level (e.g., the state of charge of an on-board battery) may be considered when determining how long a tertiary node may be used or whether the tertiary node is a good candidate before waking and connecting to the network. For example, a vehicle operating on battery that is not actively receiving charge may be used for a period of time such that the state of charge of the battery does not decrease below a predefined value. However, in instances where the battery of the tertiary node is being actively charged, that tertiary node may be a more favorable option to wake and connect to the mesh network than one that would be operating on battery power alone.

Embodiments of the systems and methods for optimizing radio metrics between nodes within a mesh network by waking up nodes not actively connected to a mesh network will now be described in more detail.

Turning now to the drawings, where like numbers refer to like structures, and particularly to FIG. 1, an illustrative embodiment of a mesh network system 100 including nodes that comprise vehicles, such as a first vehicle 102, a second vehicle 104, and a third vehicle 106 traveling in the same direction along a roadway is depicted. However, this is merely an example. In some mesh network systems 100, the second vehicle 104 may be parked and the first and third vehicles 102 and 106 may be traveling in the proximity of the second vehicle 104. In some embodiments, the vehicles of a mesh network system 100 may be separated by other vehicles on the road or may be a predefined distance apart, traveling with similar speeds, headings, proximities, destinations, and/or the like. It is further noted that different numbers and types of vehicles may be utilized by or be comprised by the mesh network system 100.

In embodiments, two or more vehicles that are determined to be traveling with similar speeds, headings, proximities, destinations, and/or the like may be identified and grouped together via their communications units in a mesh network system 100. A communications unit may comprise one or more network interface devices, telematics units, or the like. For instance, a communications unit may be a dual carrier module (DCM) that includes network interfaces for communicating via different access protocols, different duplexing schemes, in disparate frequency bands, etc. Such network interfaces may include Wi-Fi, $x^{th}$ generation cellular technology (e.g., 2G, 3G, 4G, 5G, etc.), WCDMA, LTE, LTE Advanced, ZigBee, Bluetooth, WiMAX, UMTS, code-division multiple access (CDMA), C-V2X, Global System for Mobile Communications (GSM), or the like.

The first vehicle 102, the second vehicle 104, and the third vehicle 106 may be communicatively linked to form the mesh network system 100. The mesh network system 100 may include a registry having a routing table that includes a vehicle identification (e.g., communications unit identification numbers, IP address, or other information related to the first vehicle 102, the second vehicle 104, and the third vehicle 106). A computing device or an electronic control unit of a vehicle (e.g., node) operating as the communication center for the mesh network of one or more of the first vehicle 102, the second vehicle 104, and the third vehicle 106, or a remote computing device may store the routing table in its memory (e.g., non-transitory computer-readable memory). Furthermore, the computing device may further determine member vehicles to be included in a mesh network system 100 based on their distance from each other, destination, speed, traveling path, and/or the like.

The mesh network system 100 may operate in an edge-computing environment where tasks such as navigation, autonomous environment detection and analysis, and the like may be performed by the electronic control units of the first vehicle 102, the second vehicle 104, and the third vehicle 106 that have available resources. For example, the first vehicle 102 may have an electronic control unit with advanced computing power over the second vehicle 104 and the third vehicle 106, so that the first vehicle 102 may be tasked with operations that require advanced computing resources. The second vehicle 104 may include sensor packages that are superior or positioned better with respect to their traveling relationships. Therefore, those sensor packages may be utilized over those of the first vehicle 102 and the third vehicle 106 in the mesh network system 100. As another example, the third vehicle 106 may have data or system updates that first vehicle 102 and the second vehicle 104 in the mesh network system 100 require. Therefore, instead of each of first vehicle 102, the second vehicle 104, and the third vehicle 106 establishing a cellular connection and performing tasks independently, which may be slow and costly, the first vehicle 102, the second vehicle 104, and the third vehicle in 106 the mesh network system 100, through a network interface such as WiFi, may transmit and receive data with each other. This may reduce download times and improve the distribution of a system update as vehicles may operate as additional sources of the update as opposed to a central server connected via a wide area network.

In embodiments described herein, a vehicle of the mesh network system 100 may be identified as a master node (or as also referred to herein as the communication center) vehicle by an electronic control unit of a vehicle or a remote computing device. The master node may receive the designation of master node based on capabilities of the node (e.g., a vehicle), such as processing or computing resources, advanced telematics systems, or the like. This node may also receive this designation based on information that it may have that other nodes require. A master node may operate as an access point for other nodes to connect through to access a wide area network (WAN), such as the internet. For example, some nodes may only be equipped with near field communication interfaces such as Bluetooth or WiFi. These nodes may be able to access WAN destinations by transmitting through a master node that is equipped with a communications unit having a long-range interface system (e.g., 4G LTE, 5G, etc.). The first vehicle 102, the second vehicle 104, the third vehicle 106, or other vehicles within the mesh network system 100 may each include a plurality of network interfaces configured to route communication to and from each of the vehicles. Network interfaces may be selected for communication based on a radio metric score.

Figure 2:
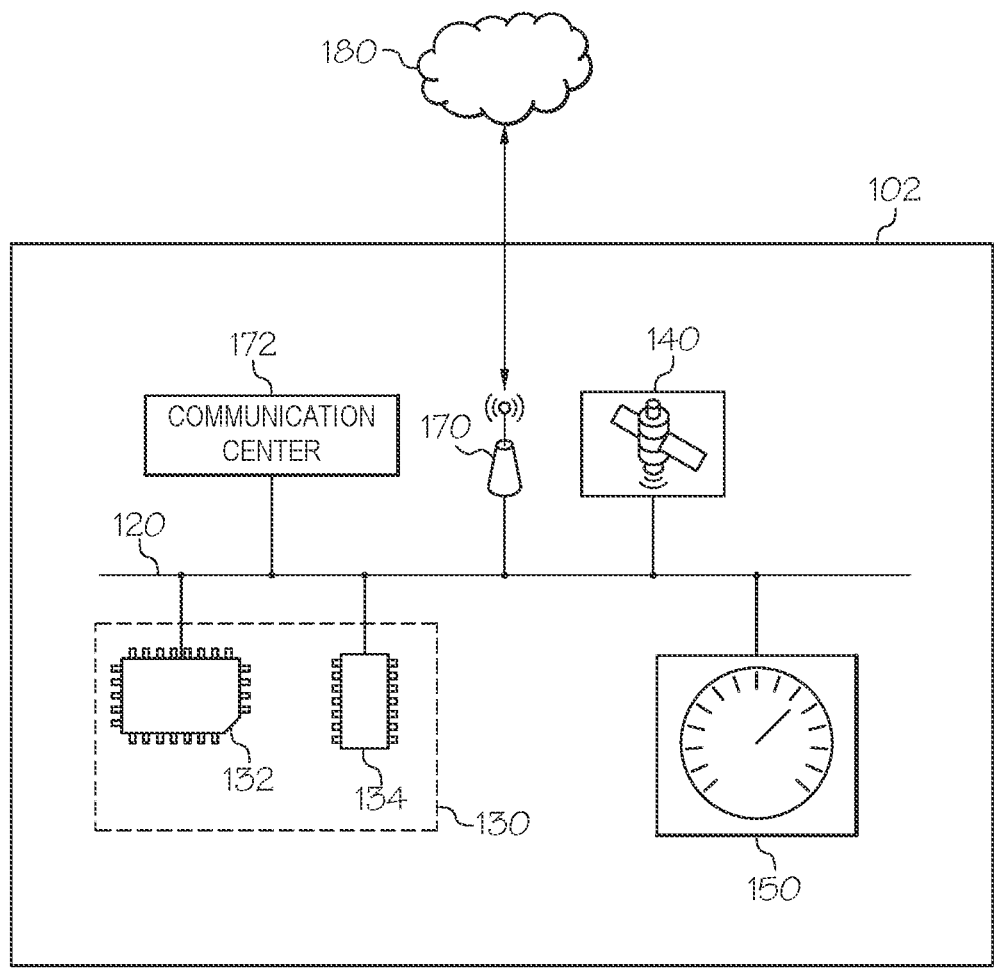
FIG. 2 schematically depicts components of a vehicle according to one or more embodiments shown and described herein.

Referring now to FIG. 2, an example schematic of a portion of the first vehicle 102 including sensor resources and a computing device is depicted. It is noted that other vehicles within the mesh network system 100 may be equipped with the same, similar, or different sets of sensor resources, telematics resources, or the like. In at least some embodiments, the first vehicle 102 may include an electronic control unit 130 comprising a processor 132 and a non-transitory computer readable memory 134, a navigation unit 140 (e.g., global positioning system (GPS), compass, etc.), a vehicle sensor(s) 150 (e.g., vehicle speed sensors, motion sensors, proximity sensors, etc.), and a communications unit 170. These and other components of the first vehicle 102 may be communicatively connected to each other via a communication bus 120.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the first vehicle 102 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. It is further noted that the processor 132 may comprise a single processor, multiple processors, or a system of processors.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It is noted that the non-transitory computer readable memory 134 may include one or more devices, memory modules, or the like.

Still referring to FIG. 2, a navigation unit 140 such as a GPS device, electronic compass, or the like may be coupled to the communication bus 120 and communicatively coupled to the electronic control unit 130 of the first vehicle 102. The navigation unit 140 is capable of generating location information and/or heading information indicative of a location of the first vehicle 102 by receiving one or more GPS signals from one or more GPS satellites. The navigation unit 140 may be configured to generate heading information, for example, based on an electronic compass. The GPS signal communicated to the electronic control unit 130 via the communication bus 120 may include location information comprising a National Marine Electronics Association (NMEA) message, a latitude and longitude data set, a street address, a name of a known location based on a location database, or the like. Additionally, the navigation unit 140 may be interchangeable with any other systems capable of generating an output indicative of a location. For example, a local positioning system that provides a location based on cellular signals and broadcast towers or a wireless signal detection device capable of triangulating a location by way of wireless signals received from one or more wireless signal antennas.

The first vehicle 102 may also include a vehicle sensor(s) 150 coupled to the communication bus 120 and communicatively coupled to the electronic control unit 130. The vehicle sensor(s) 150 may be any sensor or system of sensors for generating a signal indicative of vehicle speed, movement, proximity to other vehicles, etc. For example, without limitation, a vehicle sensor(s) 150 may be a tachometer that is capable of generating a signal indicative of a rotation speed of a shaft of the first vehicle 102 engine or a drive shaft. Signals generated by the vehicle sensor(s) 150 may be communicated to the electronic control unit 130 and converted to a vehicle speed value. The vehicle speed value is indicative of the speed of the first vehicle 102. In some embodiments, the vehicle sensor(s) 150 comprises an optoisolator slotted disk sensor, a Hall Effect sensor, a Doppler radar, or the like. In some embodiments, a vehicle sensor(s) 150 may comprise data from a GPS for determining the speed of the first vehicle 102. The vehicle sensor(s) 150 may be provided so that the electronic control unit 130 may determine when the first vehicle 102 accelerates, maintains a constant speed, slows down or comes to a stop. For example, a vehicle sensor(s) 150 may provide signals to the electronic control unit 130 indicative of a vehicle 102 slowing down due to a change in traffic conditions or prior to the vehicle performing a turning maneuver. It is further noted that the vehicle sensor(s) 150 may determine a state of a vehicle, such as a motion state of a vehicle (e.g., whether the vehicle is moving or not moving) based on one or more factors including state of an ignition (e.g., on/off), gear (e.g., idle, driving gear), speed, traffic status and position, cruise control on/off, tracking of another vehicle, tracked vehicle status, or the like.

The electronic control unit 130 may determine travel parameters such as a speed, direction of travel or heading, position, future or projected position, final destination, proximity or distance between vehicles (e.g., 1 mile, ¾ mile, ½ mile, ¼ mile, 5000 ft., 4000 ft., 3000 ft., 2000 ft., 1500 ft., 1000 ft., 500 ft., or 250 ft.), or the like based on one or more signals received from the vehicle sensor(s) 150 and/or the navigation unit 140. In some embodiments, the electronic control unit 130 selects vehicles to be included in the mesh network based on the travel parameters derived or received from the one or more signals from the vehicle sensor(s) 150 and/or navigation unit 140. For instance, the electronic control unit 130 (e.g., via the communication center 172) and/or the computing device 192 (FIG. 3) (via an electronic control unit or abstraction layer) identifies vehicles for and/or generates a mesh network including one or more vehicles based on: (i) a comparison of the speed of the vehicles (ii) a comparison of the heading of the vehicles, (iii) a comparison of the proximity of the vehicles, (iv) a calculation of the radio metrics between each of the vehicles, or the like. As one example, the computing device 192 (FIG. 3) and/or the electronic control unit 130 identify one or more vehicles of the plurality of vehicles that are traveling with a differential speed between the vehicles that is less than or equal to a predetermined speed threshold of each other and/or have a differential heading that is less than or equal to a predetermined heading threshold of each other. The predetermined speed threshold may be about +/−10 miles per hour, about +/−9 miles per hour, about +/−8 miles per hour, about +/−7 miles per hour, about +/−6 miles per hour, about +/−5 miles per hour, about +/−4 miles per hour, about +/−3 miles per hour, about +/−2 miles per hour, about +/−1 miles per hour, or about +/−0.5 miles per hour. The predetermined heading threshold may be +/−10 degrees, +/−9 degrees, +/−8 degrees, +/−7 degrees, +/−6 degrees, +/−5 degrees, +/−4 degrees, +/−3 degrees, +/−2 degrees, +/−1 degrees, +/−0.5 degrees, or +/−0.25 degrees. It is understood that these are only a few metrics, which may be calculated and considered in determining a mesh network among nodes such as vehicles.

According to embodiments, the electronic control unit 130, vehicle sensor(s) 150, and/or navigation unit 140 may determine a motion state of a vehicle based on information received from the vehicle sensor(s) 150 and/or navigation unit 140. In examples, a motion state may comprise a stationary motion state, a non-stationary motion state, a speed motion state, a range of speeds motion state, a speed based on a threshold motion state, driving patterns (e.g., stop-and-go, highway driving, etc.), proximity to other vehicles, or the like. It is noted that a motion state, such as a stationary motion state or non-stationary motion state, may include travel or vehicle information, such as whether the vehicle is moving or not moving) based on one or more factors including state of an ignition (e.g., on/off), gear (e.g., idle, driving gear), speed, traffic status and position, cruise control on/off, tracking of another vehicle, tracked vehicle status, a current position, a target or anticipated future position or destination, vehicle speeds, vehicle headings, vehicle proximities with each other, or the like. As described herein, motion states may be determined by one or more vehicle sensors, positioning data, information received from server computing devices regarding traffic (e.g., map or traffic services), or the like.

In at least some examples, the electronic control unit 130 may identify two or more vehicles that have similar common motion states and are within a determined range of each other. Common motion states may include all vehicles in a stationary motion state, a non-stationary motion state, a non-stationary motion state with similar traveling parameters (e.g., traveling at a similar current position, a target or anticipated future position or destination, vehicle speeds, vehicle headings, vehicle proximities with each other, or the like).

The non-transitory computer readable memory 134 may include or be in communication with a communication center 172. The communication center 172 may include computer readable instructions (e.g., network routing selection component logic) that, when executed by the processor 132, cause the processor 132 to provide functions of the communication center 172 described herein.

It is further noted that the communication center 172 may be implemented within or comprised by one or more devices (e.g., one or more electronic control units), remote devices (e.g., servers, remote computing devices), or the like. While embodiments may refer to a vehicle as comprising the communication center 172, it is noted that servers, remote computing devices, or the like may comprise the communication center 172. The communication center 172 may be configured to form and manage member nodes in the mesh network system 100. The communication center 172 may also be configured to optimize radio metrics between nodes within a mesh network by waking up one or more selected nodes not actively connected to the mesh network system 100 and participate in the communication between nodes therein. Processes employed by the communication center 172 to optimize radio metrics between nodes within a mesh network by waking up one or more selected nodes not actively connected to the mesh network system 100 will be described in more detail herein, for example with respect to FIGS. 3 and 4.

Figure 3:
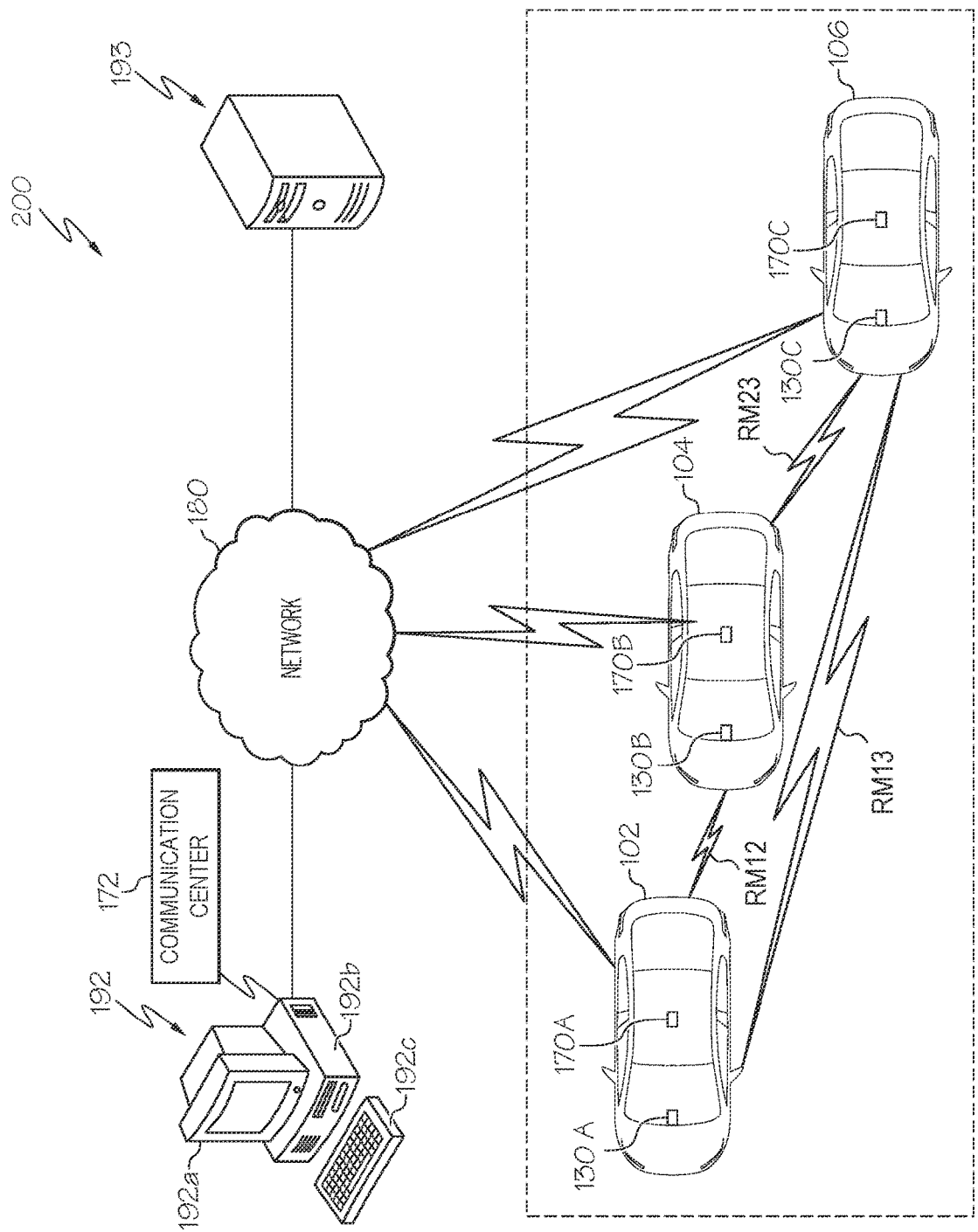
FIG. 3 depicts an illustrative embodiment of a mesh network system for selecting a desired network interface for a mesh network system according to one or more embodiments shown and described herein.

Referring now to FIG. 3 with reference to FIGS. 1 and 2, an illustrative embodiment of a system 200 for communicating with vehicles within the mesh network system 100. As noted herein, the terms "vehicle" and "node" are used interchangeably. It should be understood that while the systems and methods described herein are discussed within the context of vehicle based mesh networks, mesh networks may be configured between any types of nodes such as airplanes, communication devices, internet-of-thing (JOT) devices, or the like.

In particular, FIG. 3 depicts a first vehicle 102 having an electronic control unit 130A and a communications unit 170A, a second vehicle 104 having an electronic control unit 130B and a communications unit 170B, and a third vehicle 106 having an electronic control unit 130C and a communications unit 170C. The network 180 may include one or more computer networks (e.g., a personal area network, a local area network, or a wide area network), cellular networks, satellite networks and/or a global positioning system and combinations thereof. Accordingly, the first vehicle 102, second vehicle 104 and third vehicle 106 and the computing device 192 and/or server 193 may be communicatively coupled to each other through the network 180 via wires or wireless technologies, via a wide area network, via a local area network, via a personal area network, via a cellular network, via a satellite network, or the like. Suitable local area networks may include wired Ethernet and/or wireless technologies such as, for example, Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, C-V2X, and GSM.

As described in more detail herein, the communication center 172 (optionally implemented by the computing device 192) may establish, control, and optimize a mesh network between each of the vehicles, for example, the first vehicle 102, the second vehicle 104, and the third vehicle 106 based on radio metric scores, speed, heading, position, destination information or the like of each of the vehicles.

The computing device 192 may include a display 192a, a processing unit 192b and an input device 192c, each of which may be communicatively coupled together. The processing unit 192b may include a processor, input/output hardware, network interface hardware, a data storage, and a memory component. The server 193 may have a similar configuration as the computing device 192, but optionally configured to operate as a data storage and application support device.

The processor may include any processing component(s) configured to receive and execute instructions (such as from the data storage component and/or memory component). The instructions may be in the form of a machine-readable instruction set stored in the data storage component and/or the memory component. The input/output hardware may include a monitor, keyboard, mouse, printer, camera, microphone, speaker, and/or other device for receiving, sending, and/or presenting data. The network interface hardware may include any wired or wireless networking hardware, such as a modem, LAN port, Wi-Fi card, WiMax card, mobile communications hardware, and/or other hardware for communicating with other networks and/or devices.

It should be understood that the data storage component may reside local to and/or remote from the computing device 192 and may be configured to store one or more pieces of data such as a routing table, updates for vehicle systems, or the like for access by the computing device 192 and/or other components. It is understood that the server 193 may also be configured to store one or more pieces of data such as a routing table, updates for vehicle systems, or the like for access by the computing device 192 and/or vehicles via the network 180.

A computing device 192 and/or an electronic control unit 130 may then use the speed, heading, position, and/or destination information, also referred to herein as traveling parameters, to determine relationships between the vehicles and identify vehicles that may form a mesh network based on their traveling parameters, motion states, and the like. Once a mesh network is established by the computing device 192 or the electronic control unit 130, a master node vehicle (e.g., first vehicle 102) may be identified and utilized as an access point for other vehicles (e.g., second vehicle 104) in the mesh network system 100 to communicate with the computing device 192, the server 193, or other devices via the WAN (e.g., the network 180).

As described herein, the mesh network system 100 may include the first vehicle 102, the second vehicle 104, the third vehicle 106, and/or other vehicles, where each vehicle acts as a node. Moreover, each communications unit 170A, 170B, 170C of the respective vehicles may include network interfaces for a plurality of different networks, protocols, or the like. For instance, each communications unit 170A, 170B, 170C may include one or more antennas (e.g., many in/many out (MIMO) antennas, etc.) that may allow for communication via Wi-Fi networks, IrDA, Bluetooth, Wireless USB, Z-Wave, ZigBee, near field communication (NFC), LTE, WiMAX, UMTS, CDMA, C-V2X, GSM interfaces may include Wi-Fi, $x^{th}$ generation cellular technology (e.g., 2G, 3G, 4G, 5G, etc.), WCDMA, LTE Advanced, or the like. The electronic control units 130A, 130B, 130C (See FIG. 3) and/or the computing device 192 or the servers 193 may be configured to determine motion states of vehicles, select routing protocols, calculate radio metrics for communications between the vehicles or the communications unit 170A, 170B, 170C over the one or more network interfaces, or the like.

FIG. 3 further depicts a first vehicle 102 having an electronic control unit 130A and a communications unit 170A, a second vehicle 104 having an electronic control unit 130B and a communications unit 170B, and a third vehicle 106 having an electronic control unit 130C and a communications unit 170C. In embodiments described herein, an electronic control unit may act as a source electronic control unit (e.g., initiating or source node) which transmits an initial request, a relay electronic control unit (e.g., relay node) which receives a request and transmits to another relay node or a destination node, or a destination electronic control unit (e.g., destination node) which is a target for a request. As described in more detail herein, each of the vehicles, for example, the first vehicle 102, the second vehicle 104, and the third vehicle 106, when in range of each other, may share their speed, heading, position, destination information or the like with each other or the computing device 192.

For purposes of explanation, a mesh network having at least the first vehicle 102 and the third vehicle 106 is initially established where vehicle-to-vehicle communication between the two vehicles is depicted by RM13 (e.g., radio metric between the first vehicle 102 and the third vehicle 106). The mesh network may be managed by a communication center configured within the electronic control unit 130A of the first vehicle 102, the electronic control unit 130C of the third vehicle 106, or the computing device 192 that is communicatively coupled to the first vehicle 102 and the third vehicle 106. The second vehicle 104 initially is not actively connected to the mesh network and the communications unit 170B, for example, a DCM is operating in a sleep mode. That is, the second vehicle 104 may be parked with the ignition switched off.

The quality of a communication connection between vehicles may be quantified by a radio metric score. For example, a radio metric score C may be a function of a weighting factor "O", a bit size for a frame "Bt" data rate "r" (e.g., Mbit/sec), and a frame error rate "ef". The weighting factor O may comprise an overhead of a network interface that may be weighted according to a motion state of the node, a proximity, or the like. As such, weighting factor O may be dynamically calculated or determined. In another aspect, the bit size for a frame Bt may be a static value (e.g., the same for each network interface), such as 8192. Data rater and a frame error rate ef may be dynamic (e.g., variable depending on the wireless network interface, chipset/firmware or other components of a communications units 170, environmental factors, or the like). That is, some network interface devices work better than others do depending on the node's location, distance to another node, environmental factors (e.g., weather), interference from other wireless signals, an antenna type (e.g., directional antenna, omnidirectional antenna, etc.), vehicle motion, or the like. As an example, LTE and/or DSRC will generally provide communications that are more reliable during movement than WiFi due to robustness to Doppler Effect, etc. For instance, the following Equation 1 may be utilized to determine weighted radio metric scores for network interfaces:

$$C = \frac{(o + B_t/r)}{(1 - ef)} \quad \text{(Equation 1)}$$

By way of example, the weighting factor O for a first network interface (e.g., Wi-Fi) may be about between 1,000 and 700, or the like. In one embodiment, the weighting factor O may be 800. When in a node is moving, non-stationary motion state, or traveling at a speed above at or above a threshold, the weighting factor O may be between 1,000 and 3,000, such as about 2,000. The weighting factor O for other networks, such as DSRC, LTE, or the like may be between 1,000 and 700, such as about 800 when in stationary motion state, a non-stationary motion state, or other motion state. It is noted that the weighting factor O may comprise other values for network interfaces, may be weighted based on other motion states, or the like. The weighting factor O for a first network interface or set of network interfaces (e.g., Wi-Fi radio metric score for a Wi-Fi network interface), may be set to a small value with respect to values of a second network interface or a second set of network interfaces (e.g., DSRC radio metric score for a DSRC network interface, cellular radio metric score for a cellular network interface, etc.). Selecting a low weighting factor O will bias the radio metric value toward selecting the first network interface or set of network interfaces for routing.

The communication center 172 may calculate radio metric scores for each communication channel such as the vehicle-to-vehicle communication channels RM13, RM12, RM23 according to Equation 1. Referring back to the example depicted mesh network depicted in FIG. 3, the radio metric score for communication channel RM13, which represents the vehicle-to-vehicle communication between the first vehicle 102 and the third vehicle 106 in the mesh network is calculated by the communication center 172. When the communication center 172 determines that the radio metric between the first vehicle 102 (e.g., a first node) and the third vehicle 106 (e.g., a second node) in the mesh network is above a predetermined threshold, the communication center 172 searches and identifies, if available, a node (e.g., the second vehicle 104) that is in sleep mode and not actively connected to the mesh network. For example, the radio metric score for communication channel RM13 may be determined to be 9792 (e.g., C=(800+8192/2)/(1−0.5)), which may indicate a poor condition communication channel. To improve the communication channel between the first vehicle 102 and the third vehicle 106, the communication center 172, through a query of its registry, may identify that a third node operating in sleep mode is present in the area.

The registry (e.g., defined in a memory component of the computing device 192 or electronic control unit 130) comprises location information for a plurality of nodes including at least the first node, the second node, and the third node. The location information and other status information of a vehicle may be periodically provided to the communication center 172. In some embodiments, the communication center 172 may poll the nodes for updated status information such as location information, speed, heading data, and/or the like. When a vehicle is actively connected to the mesh network status information may be provided on a frequent basis, for example, but without limitation, every few seconds or few minutes (e.g. 10 minutes or less). However, a vehicle with its ignition switched off and communications unit operating in sleep mode, may only provide a status update every several minutes (e.g., every 10 minutes, 15 minutes, 20 minutes, 25 minutes, 30 minutes, hour or two hours). Additionally, when a communication center 172 receives updated status information, or otherwise when programed to, the communication center 172 may calculate a radio metric score for each of the communication channels between the vehicles (or nodes) in the mesh network.

Referring back the example described with respect to FIG. 3, in response to a radio metric score between the first vehicle 102 and the third vehicle 106 being above the predetermined threshold, the communication center 172 identifies a second vehicle 104 operating in sleep mode. The second vehicle 104 may be identified and selected based on its proximity to the first vehicle 102 and the third vehicle 106 being less than a predetermined distance. When selected, the communication center 172 sends a push message to the second vehicle 104 causing the second vehicle 104 to wake from sleep mode and connect to the mesh network. The activation and integration of the communications unit 170B of the second vehicle 104 with the mesh network enables commutations between the first vehicle 102 and the third vehicle 106 to operate with an improved radio metric, thus improved quality and likely speed. That is, the radio metric score for communication channel RM12 between the first vehicle 102 and second vehicle 104 and the radio metric score for communication channel RM23 between the second vehicle 104 and the third vehicle 106 are each better than the radio metric score for communication channel RM13 between the first vehicle 102 and third vehicle 106. Accordingly, there may be more bandwidth, less error, better signal strength, and the like for communications that utilize the second vehicle 104 as a relay between the first vehicle 102 and the third vehicle 106.

In some embodiments, the communication center 172 may determine the radio metric score for communication channel RM12 and communication channel RM23 once the communications unit 170B of the second vehicle 104 is active and connected to the mesh network. For example, the radio metric scores for communication channel RM12 and communication channel RM23 may be in the range of 1344 (e.g., C=(800+8192/20)/(1−0.1)). A radio metric score of 1344 may indicate a good condition connection. However, in an instance where the radio metric scores within the mesh network are not improved by the inclusion of the newly awaken node, the communication center 172 may cause the node to return to sleep and search for another sleeping node that can be activated.

Figure 4:
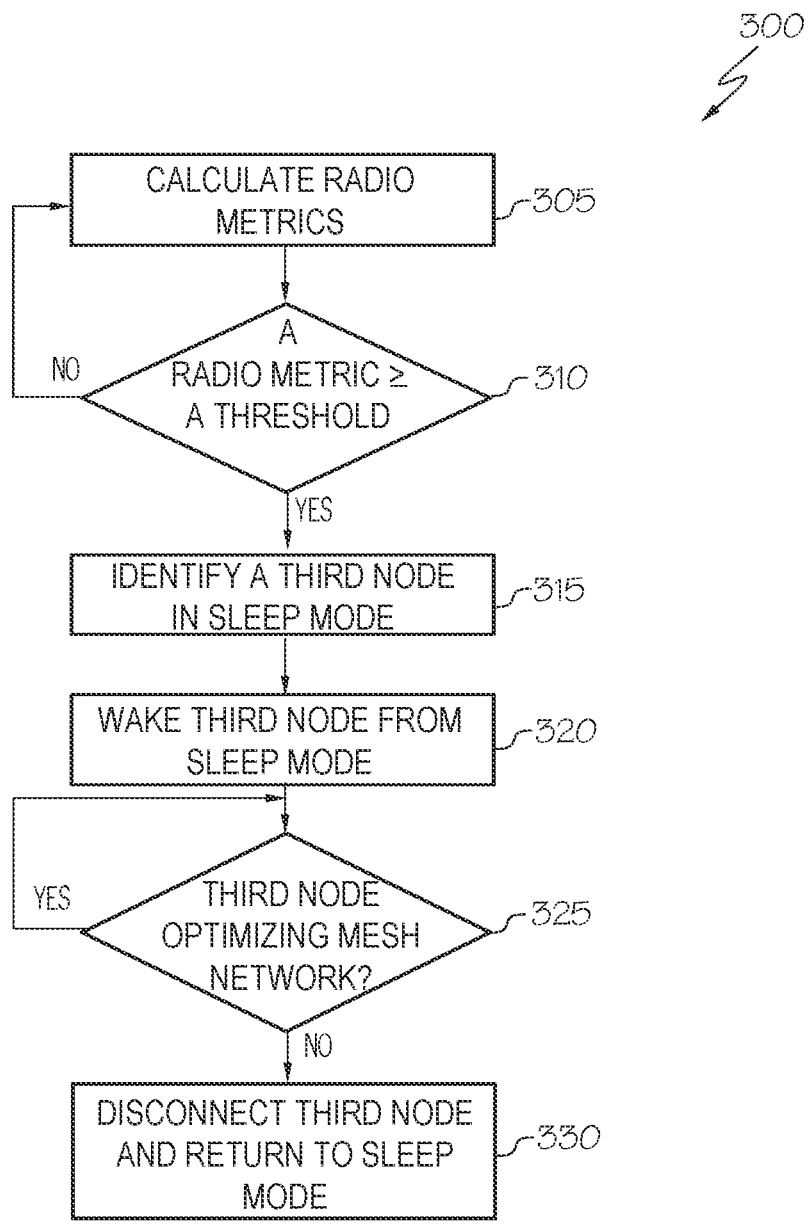
FIG. 4 depicts a flowchart of an example method for optimizing radio metrics between nodes within a mesh network by waking up nodes not actively connected to a mesh network according to one or more embodiments shown and described herein.

In view of the subject matter described herein, methods that may be related to various embodiments may be better appreciated with reference to the flowchart of FIG. 4. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by a mesh network system or components thereof, such as the computing device 192 and/or an electronic control unit 130 (e.g., FIGS. 2-3), or the like.

FIG. 4 depicts a flowchart 300 of an example method for optimizing radio metrics between nodes within a mesh network by waking up nodes not actively connected to a mesh network. The following method is described with reference to the components depicted and described in FIGS. 1-3. The method for optimizing radio metrics between nodes within a mesh network by waking up nodes not actively connected to a mesh network may be implemented by computing device 192 or an electronic control unit 130 of a vehicle or node within the mesh network. For purposes of explanation, process blocks will be described as being implemented by the communication center 172, which may be a combination of hardware and software implemented in the computing device 192 or the electronic control unit 130. Furthermore, while the method is described with respect to optimizing radio metrics (e.g., lowering the radio metric scores) between two nodes (e.g., two vehicles) within the mesh network by waking a third node that is operating in sleep mode, the method can apply to mesh networks having many more nodes.

A mesh network having a first node and a second node configured in direct communication is considered for the present explanation. A communication center 172 optionally implemented in the electronic control unit 130A of the first node or the electronic control unit 130B of the second node, or optionally through a computing device communicatively coupled to the first node and the second node is considered. At block 305, the communication center 172 calculates radio metrics for connections within the mesh network. The calculation of the radio metrics may be based on Equation 1 described herein. Additionally, it is understood that since nodes move and environments changes the radio metrics may also change. Therefore, from time to time, for example, in response to a preprogrammed interval of time, the communication center 172 may recalculate the radio metrics so that current values are available for the communication channels between nodes within the mesh network.

At block 310, the communication center 172 determines whether a radio metric for a communication channel between a pair of nodes (e.g., the first node and the second node, which may be the first vehicle 102 and the third vehicle 106, respectively) is above a predetermined threshold. If the radio metric for a communication channel between a pair of nodes is not above the predetermined threshold ("NO" at block 310), then the communication center 172 returns to block 305. If the radio metric for a communication channel between a pair of nodes is above the predetermined threshold ("YES" at block 310), then the communication center 172 proceeds to block 315. At block 315, communication center 172 identifies a third node (e.g., the second vehicle 104) currently operating in sleep mode and not actively connected and communicating within the mesh network. The communication center 172 may implement one of several different means for identifying the third node. For example, the communication center 172 may contain or have access to a registry that is updated from time to time with nodes both active in the mesh network as well as others that have been powered down into sleep mode. The registry contains information such as location information for each of the nodes. Since radio metric for wireless communication channels and proximity are related, the communication center 172 may search for other nodes that are within a predetermined area of the pair of nodes whose radio metrics is above the threshold. The predetermined area may be a proximity defined by a predetermined distance value. In some embodiments, the node currently operating in sleep mode is likely a vehicle that is parked, the location of the node may be fixed. Therefore, the proximity to the pair of nodes who are likely moving, may change with time and therefore may only provide an optimized connection if activated while each of the nodes is within the predetermined distance from each other. Additionally, the communication center 172 may identify and select a third node operating in sleep mode over a fourth node operating in sleep mode if the third node, for example, has a power source with more energy or is connected to a charging device. Similarly, the communication center 172 may evaluate the sleeping nodes state of charge and predict how long the particular node may provide an optimized connection to the mesh network based on the movement of the pair of nodes. For example, if the pair of nodes is moving toward the location of the third node operating in sleep mode but moving away from the location of the fourth node operating in sleep mode, the communication center 172 may select the third node over the fourth node. The communication center 172 may also consider other attributes such as the quality and type of communication units the node is equipped with in identifying and selected one sleeping node over another. The communication center 172 may further determine whether a sleeping node contains content that one or both of the nodes in the pair of nodes is seeking. For example, a third node operating in sleep mode may contain an update that the first node is trying to retrieve from the second node. Accordingly, by waking the third node the first node may retrieve the update faster or with fewer errors by downloading directly from the third node or in combination with the second and third node.

Once a third node is identified, at block 320, the communication center 172 causes the third node to wake and connect to the mesh network. The communication center 172 configures the third node to relay communication between the first node and the second node thereby improving the radio metrics therebetween. The communication center 172 may wake the third node by causing a push message using, for example, a Message Queuing Telemetry Transport protocol or a short message service to communicate with the third node operating in sleep mode. The push message may be sent and received through 2G, 3G, 4G, 5G or the like communication modules. The third node is capable of receiving such a message when the DCM is configured to be operating in RRC_IDLE Mode or a similar mode configured to receive push messages although other proactive data transactions are not activated in sleep mode. In some embodiments, the communication center 172, at block 325, may further confirm that the integration of the third node improves the radio metrics between the first and second nodes and optionally other nodes within the mesh network by calculating and periodically monitoring the radio metrics of communications with the third node. If a time arises where the third node is no longer improving the radio metrics of the mesh network or for other reasons such as the power source of the third node has decreased to a low state of charge ("NO" at block 325), then the communication center 172 may cause the third node to disconnect from the mesh network and return to sleep mode at block 330. Otherwise, ("YES" at block 325), the communication center 172 continues to monitor the third node's contribution to the mesh network at block 325. In some embodiments, more than one instance of the present method may be enabled at any given time and between any pair or group of nodes within the mesh network.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Accordingly, described embodiments include systems and methods for optimizing radio metrics between nodes within a mesh network by waking up nodes not actively connected to a mesh network. The mesh network systems disclosed herein include an electronic control unit and/or computing device. The electronic control unit and/or computing device is configured to determine that a radio metric between a first node and a second node in a mesh network is above a predetermined threshold, identify a third node operating in sleep mode, when the radio metric is above the predetermined threshold, and cause the third node to wake and connect to the mesh network, the third node is configured to relay communication between the first node and the second node.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mesh network system, comprising:
    a computing device configured to:
        determine that a radio metric score pertaining to communication quality between a first node and a second node in a mesh network is above a predetermined threshold;
        identify a third node operating in sleep mode, when the radio metric score is above the predetermined threshold; and
        cause the third node to wake and connect to the mesh network, the third node is configured to relay communication between the first node and the second node.

2. The mesh network system of claim 1, further comprising a registry, the registry comprises location information for a plurality of nodes including at least the first node, the second node, and the third node.

3. The mesh network system of claim 2, wherein the computing device is configured to periodically poll the nodes and receive updated location information for one or more of the plurality of nodes stored in the registry.

4. The mesh network system of claim 2, wherein the computing device receives a status signal that comprises the location information from the third node operating in sleep mode at least once every 10 minutes.

5. The mesh network system of claim 2, wherein the third node is identified when a proximity of the third node to the first node and the second node is below a predetermined distance.

6. The mesh network system of claim 1, wherein the computing device causes the third node to wake through transmission of a push message.

7. The mesh network system of claim 6, wherein the transmission of the push message is carried out using at least one of a Message Queuing Telemetry Transport protocol or a short message service protocol.

8. The mesh network system of claim 1, wherein the third node comprises a communication system configured as a dual carrier module.

9. The mesh network system of claim 8, wherein when the third node operates in sleep mode at least a WiFi communication module of the dual carrier module is turned off.

10. A method, comprising:
    determining, with a communication center, that a radio metric score pertaining to communication quality between a first node and a second node in a mesh network is above a predetermined threshold;
    identifying, with the communication center, a third node operating in sleep mode, when the radio metric score is above the predetermined threshold; and
    causing the third node to wake and connect to the mesh network, the third node is configured to relay communication between the first node and the second node.

11. The method of claim 10, wherein the communication center comprises a registry, the registry comprises location information for a plurality of nodes including at least the first node, the second node, and the third node.

12. The method of claim 11, further comprising periodically polling the nodes and receive updated location information for one or more of the plurality of nodes stored in the registry.

13. The method of claim 11, further comprising receiving a status signal that comprises the location information from the third node operating in sleep mode at least once every 10 minutes.

14. The method of claim 11, wherein the third node is identified when a proximity of the third node to the first node and the second node is below a predetermined distance.

15. The method of claim 10, wherein the third node is woken from sleep mode through transmission of a push message.

16. The method of claim 15, wherein the transmission of the push message is carried out using at least one of a Message Queuing Telemetry Transport protocol or a short message service protocol.

17. The method of claim 10, wherein the third node comprises a communication system configured as a dual carrier module.

18. The method of claim 17, wherein when the third node operates in sleep mode at least a WiFi communication module of the dual carrier module is turned off.

19. A vehicle, comprising a communication unit communicatively coupled to an electronic control unit, wherein:

the electronic control unit is configured to:
    determine that a radio metric score pertaining to communication quality between the vehicle and a second vehicle operating in a mesh network is above a predetermined threshold;
    identify a third vehicle operating in sleep mode, when the radio metric score is above the predetermined threshold; and
    cause the communication unit to send a push message to the third vehicle to wake and connect the third vehicle to the mesh network, the third vehicle is configured to relay communication between the vehicle and the second vehicle.

20. The vehicle of claim 19, wherein the electronic control unit comprises a registry, the registry comprises location information for a plurality of vehicles including at least the vehicle, the second vehicle, and the third vehicle, and the third vehicle is identified when a proximity of the third vehicle to the vehicle and the second vehicle is below a predetermined distance.

\* \* \* \* \*